(12) United States Patent
Wilson et al.

(10) Patent No.: US 7,779,087 B2
(45) Date of Patent: *Aug. 17, 2010

(54) PROCESSING NUMERIC ADDRESSES IN A NETWORK ROUTER

(75) Inventors: Reid Evan Wilson, Cary, NC (US); Philip Austin Shafer, Raleigh, NC (US); Robert P. Enns, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 611 days.

This patent is subject to a terminal disclaimer.

(21) Appl. No.: 11/654,933

(22) Filed: Jan. 18, 2007

(65) Prior Publication Data

US 2007/0118621 A1    May 24, 2007

Related U.S. Application Data

(63) Continuation of application No. 09/963,806, filed on Sep. 25, 2001, now Pat. No. 7,171,457.

(51) Int. Cl.
*G06F 15/16* (2006.01)

(52) U.S. Cl. .................. 709/219; 709/217; 709/220; 709/226

(58) Field of Classification Search .................. 709/219, 709/217, 203, 226, 245, 239, 246, 227, 223, 709/238
See application file for complete search history.

(56) References Cited

U.S. PATENT DOCUMENTS

| | | | |
|---|---|---|---|
| 5,377,103 A | 12/1994 | Lamberti et al. |
| 5,434,974 A | 7/1995 | Loucks et al. |
| 5,777,989 A | 7/1998 | McGarvey |
| 5,805,820 A | 9/1998 | Bellovin et al. |
| 5,898,835 A | 4/1999 | Truong |
| 5,958,052 A | 9/1999 | Bellovin et al. |
| 5,974,453 A | 10/1999 | Andersen et al. |
| 6,006,264 A | 12/1999 | Colby et al. |
| 6,151,631 A | 11/2000 | Ansell et al. |
| 6,269,398 B1 | 7/2001 | Leong et al. |
| 6,314,469 B1 | 11/2001 | Tan et al. |
| 6,389,276 B1 | 5/2002 | Brilla et al. |
| 6,392,997 B1 | 5/2002 | Chen |
| 6,480,508 B1 | 11/2002 | Mwikalo et al. |
| 6,480,860 B1 | 11/2002 | Monday |
| 6,560,596 B1 | 5/2003 | Margulies et al. |
| 6,587,876 B1 | 7/2003 | Mahon et al. |

(Continued)

OTHER PUBLICATIONS

Alex C. Snoeren, Kenneth Conley, David K. Gifford, Mesh-based content routing using XML (2001), Proceedings of the eighteenth ACM symposium on Operating systems principles, ACM Press, pp. 160-173, ISSN: 0163-5980.

(Continued)

*Primary Examiner*—Dohm Chankong
(74) *Attorney, Agent, or Firm*—Shumaker & Sieffert, P.A.

(57) ABSTRACT

Processing of numeric addresses is facilitated by using a user interface, rather than system modules, to handle name resolution. Processing the addresses at the user interface level avoids delays and packet blocking problems associated with using system modules to perform the task. Relieving the system modules from the responsibility of processing numeric addresses allows them to process other requests, improving overall system efficiency.

15 Claims, 4 Drawing Sheets

U.S. PATENT DOCUMENTS

| | | | |
|---|---|---|---|
| 6,614,774 B1 | 9/2003 | Wang | |
| 6,711,241 B1 | 3/2004 | White et al. | |
| 6,724,724 B1 | 4/2004 | Swenson et al. | |
| 6,732,175 B1 | 5/2004 | Abjanic | |
| 6,748,436 B1 | 6/2004 | Anand et al. | |
| 6,816,903 B1 | 11/2004 | Rakoshitz et al. | |
| 6,826,617 B1 | 11/2004 | Ansell et al. | |
| 6,826,698 B1 | 11/2004 | Minkin et al. | |
| 6,829,653 B1 | 12/2004 | Tout | |
| 6,829,654 B1 | 12/2004 | Jungck | |
| 6,882,996 B2 | 4/2005 | Preisig et al. | |
| 6,904,562 B1 | 6/2005 | Hind et al. | |
| 6,968,389 B1* | 11/2005 | Menditto et al. | 709/233 |
| 7,054,924 B1* | 5/2006 | Harvey et al. | 709/220 |
| 7,082,476 B1* | 7/2006 | Cohen et al. | 709/246 |
| 2001/0039576 A1 | 11/2001 | Kanada | |
| 2002/0009078 A1 | 1/2002 | Wilson et al. | |
| 2002/0035638 A1 | 3/2002 | Gendron et al. | |
| 2002/0040996 A1 | 4/2002 | Magnee et al. | |
| 2002/0065936 A1 | 5/2002 | Schiuma | |
| 2002/0073399 A1 | 6/2002 | Golden | |
| 2002/0083344 A1 | 6/2002 | Vairavan | |
| 2002/0087722 A1 | 7/2002 | Datta et al. | |
| 2002/0122547 A1 | 9/2002 | Hinchey et al. | |
| 2002/0141378 A1 | 10/2002 | Bays et al. | |
| 2002/0143989 A1 | 10/2002 | Huitema et al. | |
| 2002/0156875 A1 | 10/2002 | Pabla | |
| 2002/0161801 A1 | 10/2002 | Hind et al. | |
| 2002/0194317 A1* | 12/2002 | Kanada et al. | 709/223 |
| 2002/0199016 A1 | 12/2002 | Freedman | |
| 2003/0018700 A1 | 1/2003 | Giroti et al. | |
| 2003/0033155 A1* | 2/2003 | Peerson et al. | 705/1 |
| 2003/0046317 A1 | 3/2003 | Cseri et al. | |
| 2003/0051008 A1* | 3/2003 | Gorthy et al. | 709/220 |
| 2003/0056094 A1 | 3/2003 | Huitema et al. | |
| 2003/0101240 A1 | 5/2003 | Courtney | |
| 2003/0137974 A1 | 7/2003 | Kwan et al. | |
| 2003/0163570 A1 | 8/2003 | Hendley et al. | |
| 2003/0193967 A1 | 10/2003 | Fenton et al. | |
| 2003/0217096 A1 | 11/2003 | McKelvie et al. | |
| 2004/0044791 A1 | 3/2004 | Pouzzner | |

OTHER PUBLICATIONS

Y. Rekhter, RFC1265: BGP Protocol Analysis (1991), http://www.rfc-editor.org/rfc.html.

Adams, Glen, International and Character Set Standards, Sep. 1993, ACM Press New York, USA, vol. 1, Issue 1, pp. 31-39.

International Business Machines, Codeset & language information exchange between browser and backend program for multi-lingual FORM data on the web, Kenneth Mason Publications Ltd., Journal No. 42580.

International Business Machines, Method of converting UTF-8 to/from EBCDIC using an "escape character," Aug. 1999, Kenneth Mason Publications Ltd., Journal No. 42494.

Sundaresan, Neel, Moussa, Reshad, Algorithms and programming modules for efficient representation of XML for internet applications.

Duerst, Martin J., Masinter, Larry, Internationalized Uniform Resource Identifiers (IURI), Internet Society 1997, http://wvvw,ietf.cnri.reston.va.us/, Draft "draft-masinter-url-il8n.05.txt".

* cited by examiner

PROCESSING NUMERIC ADDRESSES IN A NETWORK ROUTER

This is a continuation of U.S. application Ser. No. 09/963,806, filed Sep. 25, 2001, the entire content of which is incorporated herein by reference.

TECHNICAL FIELD

The invention relates to computer networks and, more particularly, to address processing in computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

A router is associated with a numeric address, for example, an Internet Protocol (IP) address. This numeric address identifies the router and can be output by any of a number of system modules, such as Border Gateway Protocol (BGP) and Open Shortest Path First (OSPF) protocol modules. Generating numeric addresses in command output is useful and simple, and avoids problems inherent in name resolution. In many cases, however, the end user would be better served by displaying the symbolic names associated with the numeric addresses rather than the numeric addresses themselves.

In some routers, name resolution is handled by the module that generates the numeric address. The module typically queries a name server, e.g., a domain name server (DNS), which resolves the numeric address to a symbolic name. While this approach will usually produce a name, the process is time-consuming because the name server is typically not located in the same place as the router. The delay introduced by querying the name server can lead to packet blocking problems while the address is being resolved. Further, other activities, such as updating the router table, are delayed until the name is resolved. Additional problems may result if the name server is unavailable or not present.

Other routers use proxies to report the address information, rather than the modules themselves. While this approach may relieve some of the burden on the modules, it involves a more complex architecture.

SUMMARY

In general, the invention facilitates processing of numeric addresses by directing the user interface, rather than the system modules, to handle the task. Accordingly, a user-specific module processes the addresses, thereby avoiding packet blocking problems while avoiding the need for more complex architectures. Relieving the system modules from this task allows the system modules to process other tasks, improving overall system efficiency. In addition, the need to build code for handling addresses into the system modules is eliminated. Instead, only the user-specific module includes the code.

Certain embodiments of the invention may involve encoding numeric address information using a markup language, such as XML. XML is one example of a markup language in the class encompassed by the Standard Generalized Markup Language (SGML) specification, and will be described herein for purposes of illustration.

In one embodiment, the invention is directed to a method in which a router receives output in a format describing a type of the output. A server selected as a function of the type of the output is queried, and the router provides a response from the server to a user.

Another embodiment is directed to a method for processing an address in which a numeric address is received in a self-describing format. A name server is queried to resolve the numeric address to a symbolic name. The symbolic name is provided to a user.

Still another embodiment is directed to a method for processing an address in which a command is received in a user interface module. A system module is invoked to process the command and produces an XML-tagged IP address. A domain name server is queried to resolve the IP address to a symbolic name, which is provided to a user.

Other embodiments are directed to processor-readable media, apparatuses, and systems for performing these methods. The details of one or more embodiments of the invention are set forth in the accompanying drawings and the description below. Other features, objects, and advantages of the invention will be apparent from the description and drawings, and from the claims.

DETAILED DESCRIPTION

A router facilitates processing numeric addresses by directing a user interface, rather than system modules, to handle processing. Addresses are processed by a user-specific module, avoiding packet blocking problems while maintaining a relatively simple software architecture. Relieving the system modules from this task allows the system modules to process other tasks, improving overall system efficiency. In addition, the need to build address handling code into the system modules is eliminated. Instead, only the user-specific module includes address handling code. Code development is thus simplified.

In this discussion, various embodiments of the invention are described in the context of resolving numeric addresses to symbolic names. The principles of the invention, however, are generally applicable to any application involving using a remote server to obtain a numeric address. Some such applications involve tasks other than name resolution. For example, the techniques described herein can be used to identify an owner associated with an address or to determine router policies associated with an address.

Figure 1:
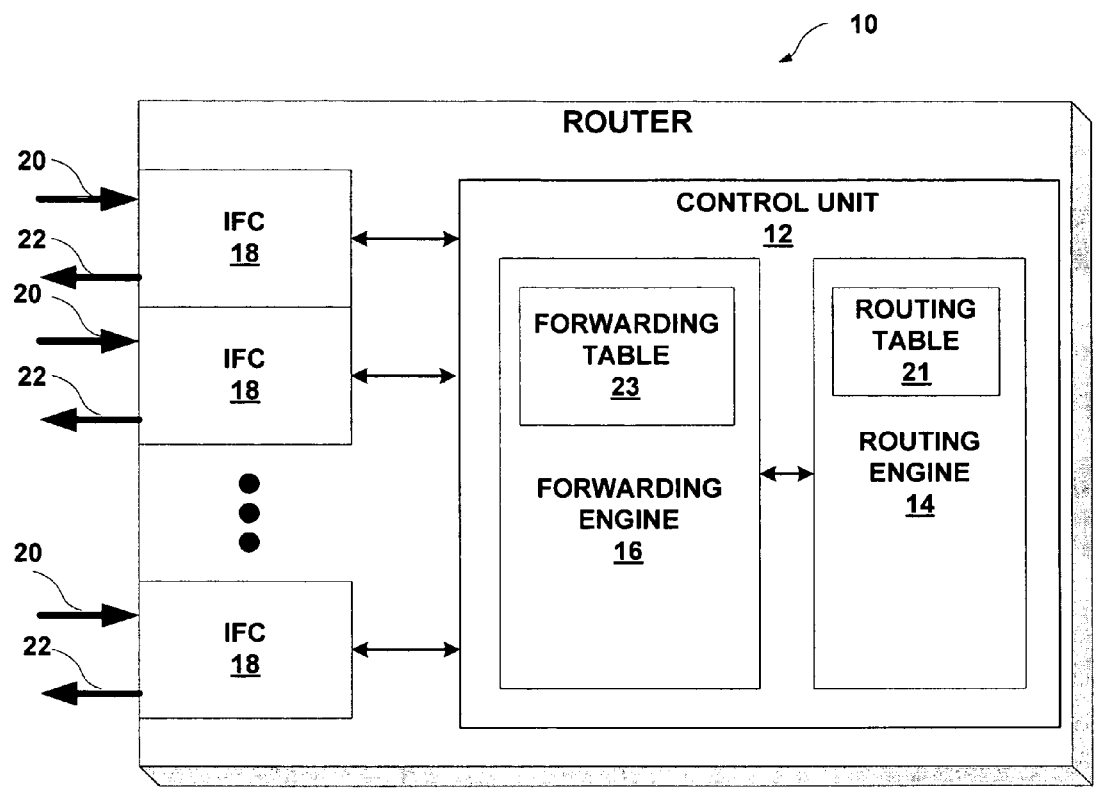
FIG. 1 is a block diagram illustrating an example router configured consistent with the principles of the invention.

FIG. 1 is a block diagram illustrating an example network router 10 appropriate for resolving numeric addresses into symbolic names in accordance with the principles of the invention. Network router 10 receives and forwards data packets across a network. As shown in FIG. 1, router 10 includes a control unit 12 with a packet routing engine 14 and a packet forwarding engine 16. Router 10 also includes one or more interface cards (IFCs) 18 for receiving and sending data packets via network links 20 and 22, respectively. Control unit 12 routes inbound packets received from inbound link 20 to the appropriate outbound link 22. Control unit 12 routes packets according to routing information stored in routing table 21.

Routing engine 14 maintains and updates the routing information within routing table 21. Forwarding engine 16 analyzes the contents of routing table 21 prior to receiving packets and pre-selects routes to be used when forwarding packets. Forwarding engine 16 then stores the selected routes in forwarding table 23. Upon receiving an inbound packet, forwarding engine 16 examines information within the packet to identify the destination of the packet. Based on the destination, forwarding engine 16 selects an available route and forwards the packet to one of the IFCs 18. IFCs 18 may be configured according to one of several different network protocols.

Packet routing engine 14 contains system modules, at least some of which generate numeric addresses as output. These system modules may include, for example, BGP and/or OSPF protocol modules. Other system modules include, but are not limited to, firewall filters. Consistent with the principles of the invention, the data output by these system modules is self-describing. At least some of the system modules generate numeric addresses that are tagged using, e.g., XML tags, to identify them as addresses. For example, the numeric address 10.0.0.1 might be tagged using the following format:

<address>10.0.0.1</address>

Other modules can then resolve the tagged numeric addresses into symbolic names, for example, by invoking a command line interface (CLI) that queries a domain name server (DNS) to determine the name associated with a numeric address. Accordingly, the task of resolving numeric addresses to symbolic names is shifted from the system modules to the command line interface, thereby freeing the system modules to handle other requests.

Router 10 may include, or be used in conjunction with, some form of computer-readable media. By way of example, and not limitation, computer readable media may comprise computer storage media and/or communication media. Computer storage media includes volatile and nonvolatile, removable and nonremovable media implemented in any method or technology for storage of information such as processor-readable instructions, data structures, program modules, or other data. Computer storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by router 4. Communication media typically embodies processor readable instructions, data structures, program modules, or other data in a modulated data signal, such as a carrier wave or other transport medium and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Computer readable media may also include combinations of any of the media described above.

Figure 2:
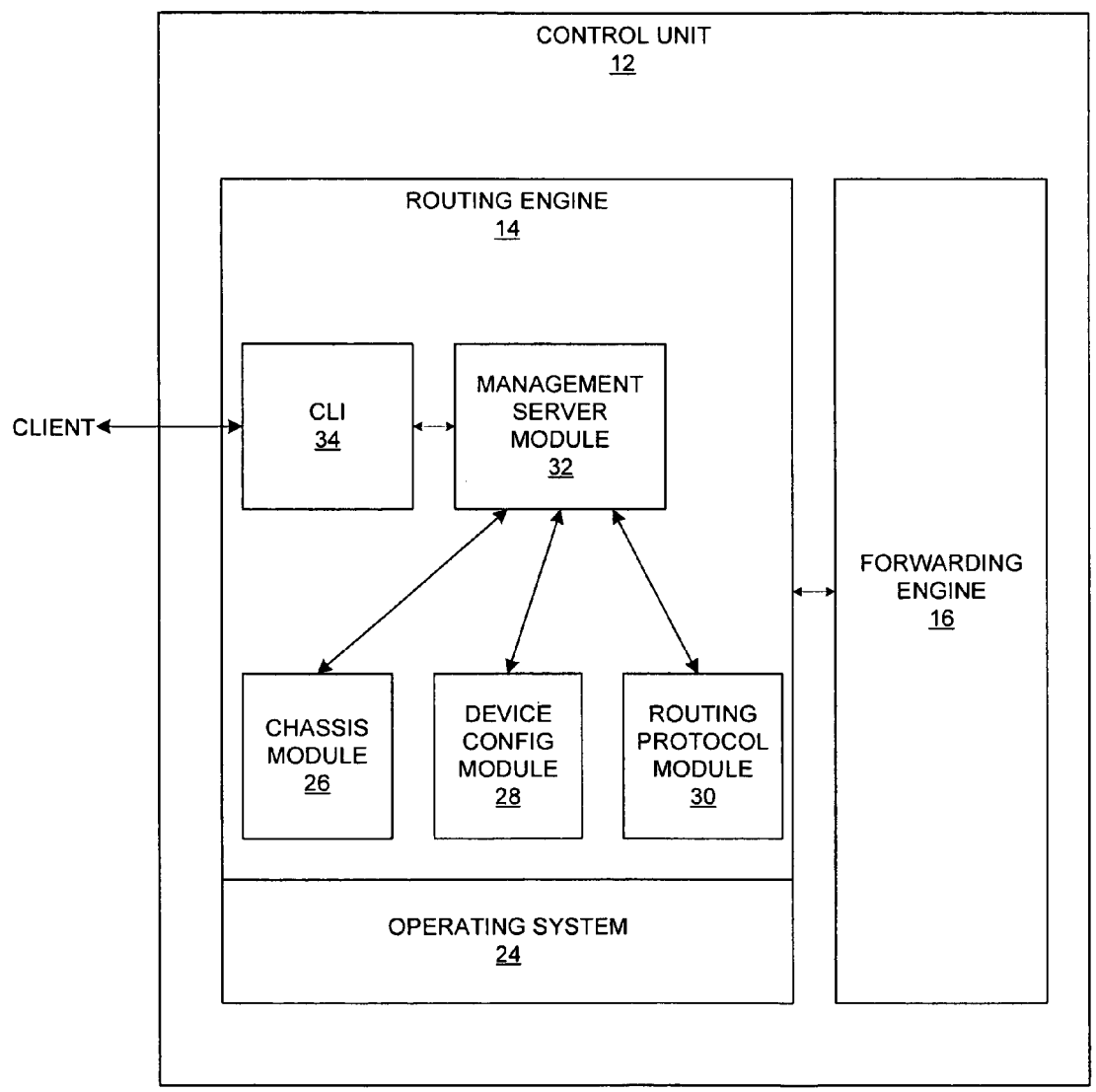
FIG. 2 is a block diagram illustrating an example routing engine consistent with the principles of the invention.

FIG. 2 is a block diagram illustrating an example router control unit 12 incorporating a command line interface consistent with the principles of the invention. In the example of FIG. 2, control unit 12 includes packet routing engine 14 and packet forwarding engine 16. Within control unit 12, routing engine 14 provides a management interface that interacts with a number of software modules running within an operating environment provided by operating system 24. Operating system 24 provides a multi-tasking operating system for execution of a number of concurrent processes. An example of such an operating system is FreeBSD, which is an advanced UNIX operating system that is compatible with a number of programmable processors (not shown), including processors commercially available from Intel Corporation.

As examples, routing engine 14 may include a chassis module 26, a device configuration module 28, and a routing protocol module 30 running as processes within the operating environment of operating system 24. A management server module 32 provides a user interface for interaction with system modules 26, 28, 30. Chassis module 26 defines an inventory and status of components installed in the chassis of network router 10, including IFCs 18. Device configuration module 28 defines and controls the physical configuration of network router 10. Routing protocol module 30 administers protocols supported by network router 10. For example, routing protocol module 30 may implement protocols for exchanging route information with other routing devices and for updating routing table 21 (shown in FIG. 1).

Management server module 32 communicates with one or more client interface modules running on routing engine 14. In the example of FIG. 2, management server module 32 communicates with a command line interface (CLI) module 34. Command line interface module 34 serves as a daemon process that listens for requests from network router clients. The clients may take the form of human users such as system administrators or automated script applications. Initially, command line interface module 34 listens for CLI commands, and passes them to management server module 32 for handling. The command line interface presented by control unit 12 can be dynamically replaced with an XML-based API upon receipt of a particular CLI command from a client. More specifically, management server module 32 redirects incoming commands from CLI 34 and services them based on the XML-based API.

XML is one example of an extensible markup language in the class encompassed by the Standard Generalized Markup Language (SGML) specification, and will be described herein for purposes of illustration. The official XML specification is governed by the World Wide Web Consortium and is available on the World Wide Web at http://www.w3.org/TR/REC-xml. The structure of the XML tags communicated via the XML API may be defined using Data Type Definition (DTD) files, XML Schema Language files, or other similar devices for XML tag definition. As an example, the XML tags may conform to the evolving JUNOScript™ API developed by Juniper Networks, Inc. of Sunnyvale, Calif. The JUNOScript™ API is described in JUNOScript™ API Guide and Reference, Version 4.4, available from Juniper Networks, Inc., the entire content of which is incorporated herein by reference.

Figure 3:
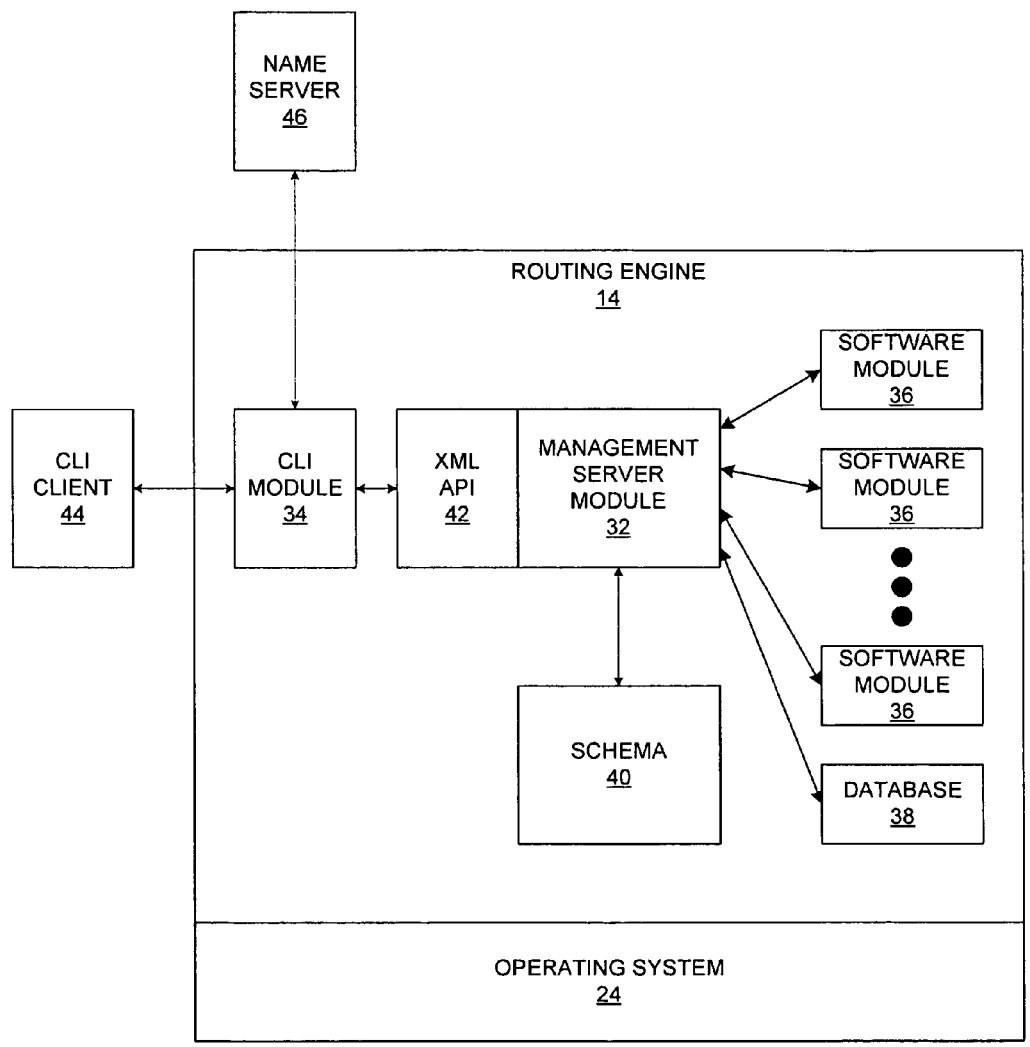
FIG. 3 is a block diagram illustrating a network router incorporating a CLI module that supports address resolution according to the principles of the invention.

FIG. 3 is a block diagram illustrating a network router incorporating a CLI module that supports resolution of numeric addresses into symbolic names, consistent with the principles of the invention. In the example of FIG. 3, management server module 32 accesses one or more system modules 36 running on routing engine 14, as well as other router resources, such as database 38, to serve client requests. System modules 36 may include a variety of software modules such as chassis module 26, device configuration module 28, and routing protocol module 30 described with reference to FIG. 2. System modules 36 may also include a BGP protocol module, an OSPF protocol module, and/or a firewall filter module.

Database 38 may store information associated with system modules 36, such as router configuration information and operational information. A management interface schema 40 maps extensible markup language tags received by management server module 32 to information associated with system modules 36, including the information in database 38 and information that may be obtained directly from system modules 36. Schema 40 may take the form of a data definition language (DDL) file, and can be stored on a hard disk or other data storage medium.

Management server module 32 presents an XML API 42. A variety of network router clients, such as a CLI client 44, may establish independent communication sessions with management server module 32 using CLI module 34. CLI client 44 may take the form of a remote computer operated by a human user who enters CLI commands encoded with XML tags that conform to the API. In this case, the client application running on CLI client 44 may render the XML output received from management server module 32 as command line output, e.g., in a textual form.

One or more of the system modules 36 provide output to CLI module 34. This output includes numeric address information, such as IP addresses. For example, in response to the command show BGP neighbors—name a BGP protocol module may return a list of network peers identified by their respective IP addresses. A user, such as a human user operating a remote computer of CLI client 44, would often find it more useful to receive a list of network peers identified by symbolic names, rather than numeric IP addresses. Accordingly, as described below in connection with FIG. 4, CLI module 34 queries a name server 46, such as a domain name server (DNS), to resolve the numeric address information to a symbolic name. To facilitate name resolution, system module 36 outputs the numeric addresses in a self-describing format using, for example, XML tags.

Using CLI module 34 to perform the address resolution relieves the BGP protocol module from this task and the delays associated with querying name server 46. As a result, the BGP protocol module is available to process other requests. More generally, CLI module 34 may handle name resolution for all system modules 36, allowing them to perform other tasks.

Figure 4:
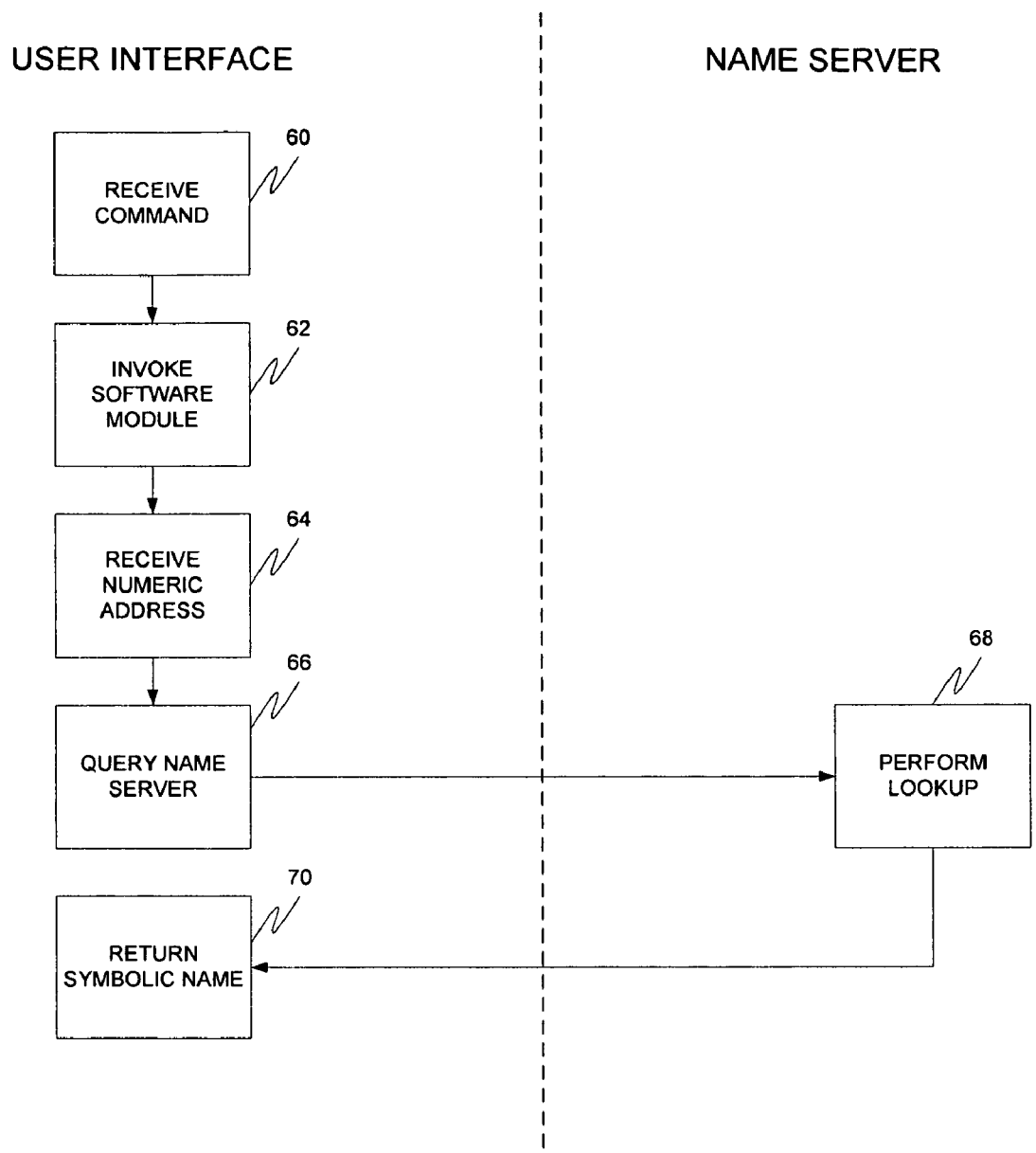
FIG. 4 is a flow diagram illustrating a mode of operation of performing address resolution consistent with the principles of the invention.

FIG. 4 is a flow diagram illustrating a mode of operation of CLI module 34 of FIG. 3 to perform address resolution consistent with the principles of the invention. Upon receiving a command, or operational request, that produces an address or addresses as output (60), CLI module 34 invokes the appropriate system module 36 via management server module 32 to perform the desired operation, e.g., obtaining a list of network peers (62). CLI module 34 determines which system module 36 to invoke based on the type of operation requested. CLI module 34 then receives the address or addresses in a self-describing data format, such as XML-tagged output (64). With the address or addresses expressed in a self-describing data format, CLI module 34 can readily parse the output of system module 36 and identify any numeric addresses contained in the output.

CLI module 34 then submits a query to a name server, such as a DNS server (66). This query contains the numeric address or addresses, which may be rendered in ASCII format. For example, the query may take the form of a "resolve" command sent to the DNS server. The DNS server performs a lookup operation to resolve each numeric address to a symbolic name (68) and returns a list of symbolic names to CLI module 34. CLI module 34, in turn, returns these symbolic names to the client that issued the original command (70). Accordingly, name resolution is handled by CLI module 34 and the DNS server, rather than by system module 36. As a result, system module 36 does not become blocked, and is free to process other tasks.

Not all numeric addresses are necessarily resolved to names. For example, if one system module 36 presents numeric addresses to another system module 36 rather than a human user, name resolution may not be necessary. In one embodiment, CLI module 34 determines which addresses to resolve on a case-by-case basis, rather than attempting to resolve every tagged numeric address.

Further, CLI module 34 can resolve addresses in whole or in part. As a specific example, port numbers may be left unresolved. Thus, CLI module 34 may resolve the numeric address <address>10.0.0.1:179</address> to the symbolic name example.domain.net:179.

Addresses output in a self-describing format by system modules 36 may be used for purposes other than resolution to symbolic names. For example, an address can be used to look up a database to determine the owner associated with the address. Alternatively, CLI module 34 can use the address to look up a router policy database to determine which policies are in effect for a particular address. In general, the invention is applicable to any operation that involves using a remote server to obtain information about a numeric address.

A number of implementations and embodiments of the invention have been described. Nevertheless, it is understood that various modifications can be made without departing from the spirit and scope of the invention. For example, while some embodiments have been described using the specific example of XML tagged output, the invention is not limited to use with this particular format. Further, the principles of the invention can be applied in contexts other than address resolution. As specific examples, self-describing output can be used to highlight error messages or to selectively hide information to which a user is not privy. Accordingly, these and other embodiments are within the scope of the following claims.

The invention claimed is:

1. A routing device comprising:
a network interface;
a client interface to receive an operational request from a network router client via the network interface;
a management server module communicatively coupled to the client interface; and
a router system module to receive the operational request from the management server module, process the operational request and to provide output to the client interface in a format including one or more tags that describe a type of the output, wherein the client interface is configured to query a server based on the output, to receive from the server information associated with the output, and to provide a response from the server to the network router client based on the information.

2. The routing device of claim 1, wherein the output is a numeric address.

3. The routing device of claim 2, wherein the server includes a name server, and the information includes a symbolic name associated with the numeric address.

4. The routing device of claim 2, wherein the server includes an owner database, and the information includes an identification of an owner associated with the numeric address.

5. The routing device of claim 2, wherein the server includes a router policy database, and the information includes an identification of one or more router policies associated with the numeric address.

6. The routing device of claim 1, wherein the router system module provides the output to the client interface in an XML-tagged format.

7. The routing device of claim 1, wherein the client interface is further configured to render the output in a text format different from the format that describes a type of the output before querying the server.

8. The routing device of claim 7, wherein the text format is selected from the group consisting of an ASCII format, a UTF-8 format, and a Unicode format.

9. The routing device of claim 1, wherein the output comprises a listing of network peers identified by numeric addresses.

10. A routing device comprising:
a network interface;
a client interface to receive an operational request from a network router client via the network interface; and
a router system module to receive the operational request from the management server module, process the operational request and to provide output to the client interface in a format including one or more tags that describe a type of the output,
wherein the router system module is one of a BGP protocol module, an OSPF protocol module or a firewall filter module,
wherein the client interface is configured to query a server based on the output, to receive from the server information associated with the output, and to provide a response from the server to the network router client based on the information.

11. The routing device of claim 1, further comprising at least one of a chassis module, a device configuration module, and a routing protocol module.

12. A routing device comprising:
a network interface;
a client interface to receive an operational request from a network router client via the network interface; and
a system module to process the operational request and to provide a tagged IP address to the client interface,
wherein the system module is one of a BGP protocol module, an OSPF module or a firewall filter module,
wherein the client interface is configured to query a domain name server to resolve the IP address to a symbolic name and to provide the symbolic name to the network router client.

13. The routing device of claim 12, further comprising at least one of a chassis module, a device configuration module, and a routing protocol module.

14. A routing device comprising:
a network interface;
a client interface to receive an operational request from a network router client via the network interface; and
a management server module communicatively coupled to the client interface;
a system module to receive the operational request from the management server module, process the operational request and to provide a tagged IP address to the client interface,
wherein the client interface is configured to query a domain name server to resolve the IP address to a symbolic name and to provide the symbolic name to the network router client.

15. A routing device comprising:
a network interface;
a client interface to receive an operational request from a network router client via the network interface;
a management server module communicatively coupled to the client interface; and
a router system module to receive the operational request from the management server module and provide output to the client interface, wherein the output includes a tags that describe a numeric value as a network address,
wherein the client interface is configured to query a server based on the output to receive from the server a symbolic name associated with the network address, and
wherein the client interface is configured to provide a response to the network router client communicating the output from the router system module by replacing the network address identified by the tags in the output with the symbolic name received from the server.

* * * * *